US005960126A

United States Patent [19]
Nielsen et al.

[11] Patent Number: 5,960,126
[45] Date of Patent: Sep. 28, 1999

[54] METHOD AND SYSTEM FOR PROVIDING RELEVANCE-ENHANCED IMAGE REDUCTION IN COMPUTER SYSTEMS

[75] Inventors: Jakob Nielsen, Atherton; Bruce Tognazzini, Woodside; Robert Glass, Los Gatos, all of Calif.

[73] Assignee: Sun Microsystems, Inc., Palo Alto, Calif.

[21] Appl. No.: 08/651,388

[22] Filed: May 22, 1996

[51] Int. Cl.[6] .............................. G06K 9/20; G06K 9/32; G09G 5/00; H04N 1/40
[52] U.S. Cl. .......................... 382/298; 382/282; 345/127; 345/129; 358/449; 358/453
[58] Field of Search ..................... 382/282, 298, 382/112, 118; 345/127, 129, 131; 358/449, 540, 453, 406

[56] References Cited

U.S. PATENT DOCUMENTS

| | | | |
|---|---|---|---|
| 4,724,330 | 2/1988 | Tuhro | 358/406 |
| 5,146,548 | 9/1992 | Bijnagte | 395/117 |
| 5,335,295 | 8/1994 | Ferracini et al. | 382/295 |
| 5,473,740 | 12/1995 | Kasson | 358/453 |
| 5,617,528 | 4/1997 | Stechmann et al. | 358/540 |
| 5,631,747 | 5/1997 | Farrell et al. | 358/449 |
| 5,675,390 | 10/1997 | Schindler et al. | 348/552 |

*Primary Examiner*—Bipin H. Shalwala
*Assistant Examiner*—Daniel G. Mariam
*Attorney, Agent, or Firm*—McDermott, Will & Emery

[57] ABSTRACT

The present invention provides a method and system for providing relevance-enhanced image reduction in computer systems. Using such a method and system, information including images can be displayed in a display area that is smaller than the display area for which the information was designed while accurately conveying the overall content of the information. A computer system in which the present invention operates includes a computer connected to a display device and a secondary storage device. A reducer is stored in the secondary storage device for execution by the computer. Additionally, data regarding an image to be displayed on the display device is stored in the secondary storage device. In operation, the computer receives data regarding an image to be displayed from the secondary storage device. The reducer reduces the image by first cropping the image and then scaling the image. Lastly, the computer displays the reduced image on the display device. In order to reduce the image, the reducer initially determines a total reduction factor by which the image is to be reduced. The reducer then determines a center of relevance of the image. Next, the reducer determines a cropping reduction factor by which the image is to be cropped and crops the image around the center of relevance by the cropping reduction factor. Lastly, the reducer determines a scaling reduction factor by which the cropped image is to be scaled and scales the cropped image by the scaling reduction factor.

27 Claims, 11 Drawing Sheets

METHOD AND SYSTEM FOR PROVIDING RELEVANCE-ENHANCED IMAGE REDUCTION IN COMPUTER SYSTEMS

FIELD OF THE INVENTION

The present invention relates generally to computer systems and, more particularly, to a method and system for providing relevance-enhanced image reduction in computer systems.

BACKGROUND OF THE INVENTION

Computer systems enable users to view information on display devices. The information that can be viewed may include pure text, pure images, or a combination of text and images. Occasionally, the user may need to view the information in a display area that is smaller than the display area for which the information was intended and designed. Such a situation may arise if the user desires to view more than one page in a display area that was designed to display only one page or if the user desires to view the page on a portable computer with a small display area. Therefore, a need exists to display information in a display area that is smaller than the display area for which the information was designed.

When the information consists solely of text, one solution is to display a summary of the text. For example, if the text includes headings, only the headings are displayed to the user. The headings convey the overall content of the text to the user. Alternatively, if the text includes an opening and/or closing paragraph, one or both of these paragraphs are displayed to the user. Again, the opening and/or closing paragraph conveys the overall content of the text to the user. While this solution is satisfactory when the information consists solely of text, it is not satisfactory when the information includes images. When the information includes images, it is not possible to accurately convey the overall content of the image to the user by displaying a summary of the image.

Figure 1:
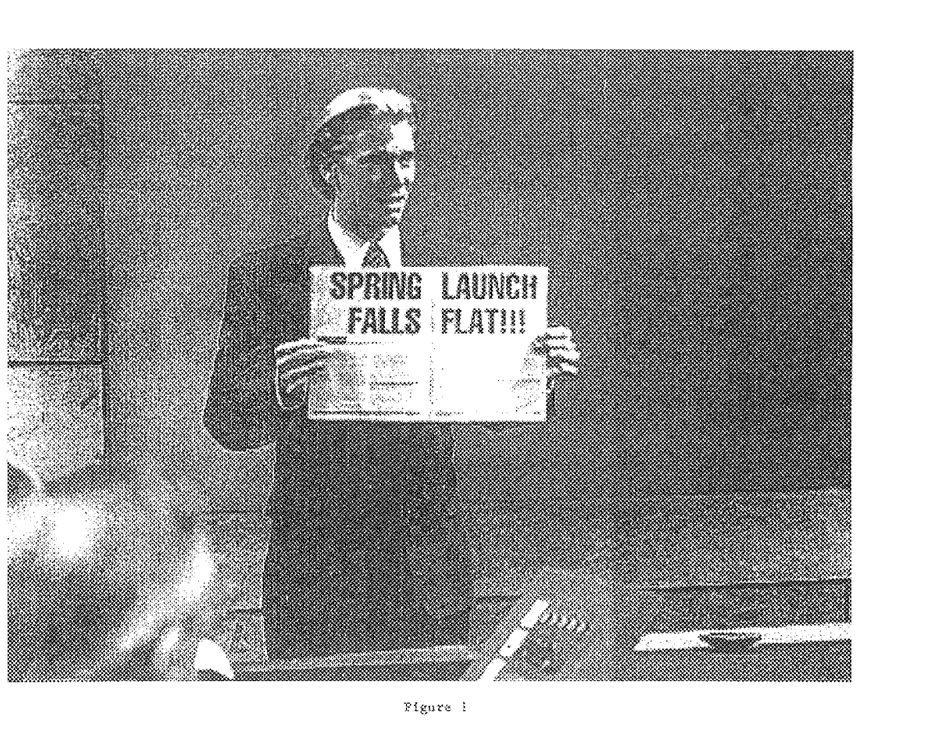
FIG. 1 is an image of a man holding a newspaper.
Figure 2A:
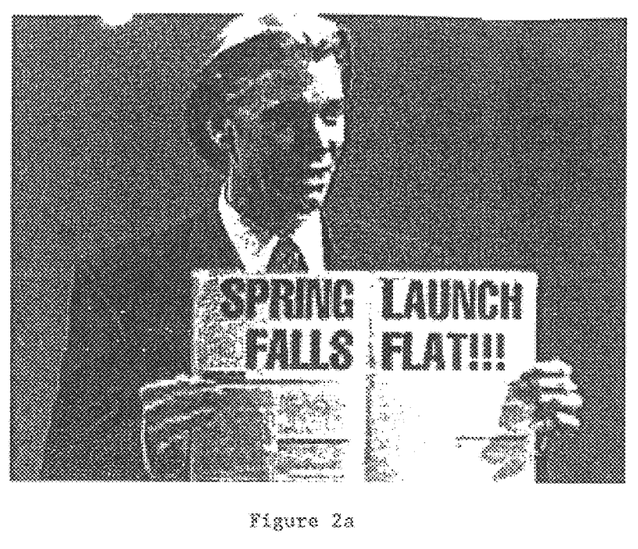
FIGS. 2a, 2b, and 2c are the image of FIG. 1 after it has been cropped to fit in a display area that has been reduced to 50%, 25%, and 12.5%, respectively, of the size of the original display area in both the horizontal and vertical directions.
Figure 2B:
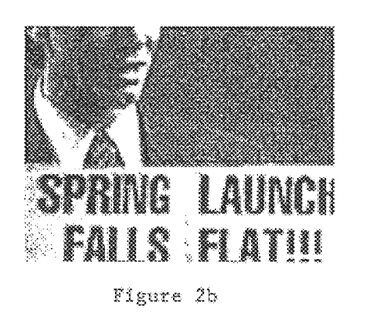
Figure 2C:
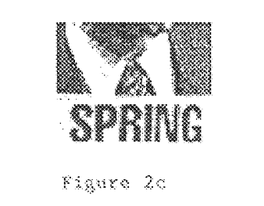

Traditionally, two methods have been used to display an image in a display area that is smaller than the display area for which the image was designed. The first method involves cropping the image. With cropping, the size of the image is maintained while outer portions of the image are cut off or trimmed until the remaining uncut or untrimmed portion can be displayed in the smaller display area. For example, FIG. 1 shows an image of a man holding a newspaper with a headline that reads "SPRING LAUNCH FALLS FLAT!!!" FIGS. 2a, 2b, and 2c show the image after it has been cropped to fit in a display area that has been reduced to 50%, 25%, and 12.5%, respectively, of the size of the original display area in both the horizontal and vertical directions.

Figure 3A:
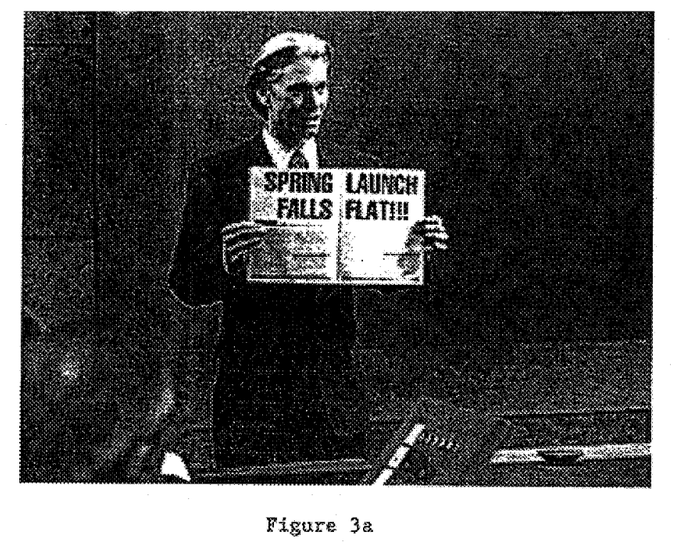
FIGS. 3a, 3b, and 3c are the image of FIG. 1 after it has been scaled to fit in a display area that has been reduced to 50%, 25%, and 12.5%, respectively, of the size of the original display area in both the horizontal and vertical directions.
Figure 3B:
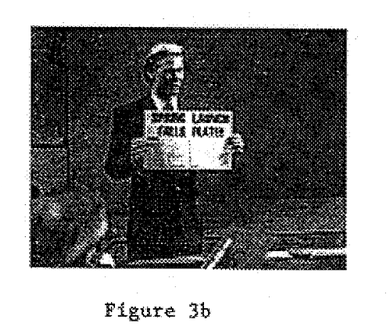
Figure 3C:
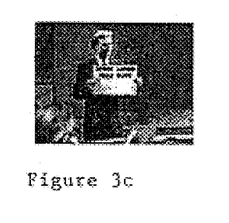

The second method that has been used to display an image in a display area that is smaller than the display area for which the image was designed involves scaling the image. With scaling, the image is proportionally reduced until the entire image can be displayed in the smaller display area. FIGS. 3a, 3b, and 3c show the image of FIG. 1 after it has been scaled to fit in a display area that has been reduced to 50%, 25%, and 12.5%, respectively, of the size of the original display area in both the horizontal and vertical directions.

The problems with these traditional methods are apparent from the previous examples. While cropping maintains the resolution of the original image, it sacrifices the context of the original image. With cropping, portions of the image become unviewable as the display area gets smaller until the remaining uncropped portion of the image does not include enough of the context of the original image to accurately convey the overall content of the original image. Referring to FIG. 2a, the remaining uncropped portion of the image includes sufficient context of the original image to convey the overall content of the original image. Referring to FIGS. 2b and 2c, however, the remaining uncropped portions of the image do not include sufficient context of the original image so that it becomes impossible to convey the overall content of the original image.

In contrast to cropping, while scaling maintains the entire context of the original image, it sacrifices the resolution of the original image. With scaling, the resolution of the image decreases as the display area gets smaller until the resolution of the scaled image is too low to accurately convey the overall content of the original image. Referring to FIG. 3a, the resolution of the scaled image is sufficient to convey the overall content of the original image. Referring to FIGS. 3b and 3c, however, the resolution of the scaled images is too low so that it becomes impossible to convey the overall content of the original image. Therefore, a need still exists to display information including images in a display area that is smaller than the display area for which the information was designed while accurately conveying the overall content of the information.

SUMMARY OF THE INVENTION

The preferred embodiment of the present invention provides a method and system for providing relevance-enhanced image reduction in computer systems. Using such a method and system, information including images can be displayed in a display area that is smaller than the display area for which the information was designed while accurately conveying the overall content of the information.

A computer system in which the preferred embodiment of the present invention operates includes a computer for controlling the operation of the system. The computer is connected to a display device and a secondary storage device. A reducer is stored in the secondary storage device for execution by the computer. Additionally, data regarding an image to be displayed on the display device is stored in the secondary storage device.

In operation, the computer receives data regarding an image to be displayed from the secondary storage device. The reducer reduces the image by first cropping the image and then scaling the image. Lastly, the computer displays the reduced image on the display device.

In order to reduce the image, the reducer initially determines a total reduction factor by which the image is to be reduced. The reducer then determines a center of relevance of the image. Next, the reducer determines a cropping reduction factor by which the image is to be cropped and crops the image around the center of relevance by the cropping reduction factor. Lastly, the reducer determines a scaling reduction factor by which the cropped image is to be scaled and scales the cropped image by the scaling reduction factor.

DETAILED DESCRIPTION OF THE PREFERRED EMBODIMENT

The preferred embodiment of the present invention provides a method and system for providing relevance-enhanced image reduction in computer systems. Using such a method and system, information including images can be displayed in a display area that is smaller than the display area for which the information was designed while accurately conveying the overall content of the information.

Figure 4:
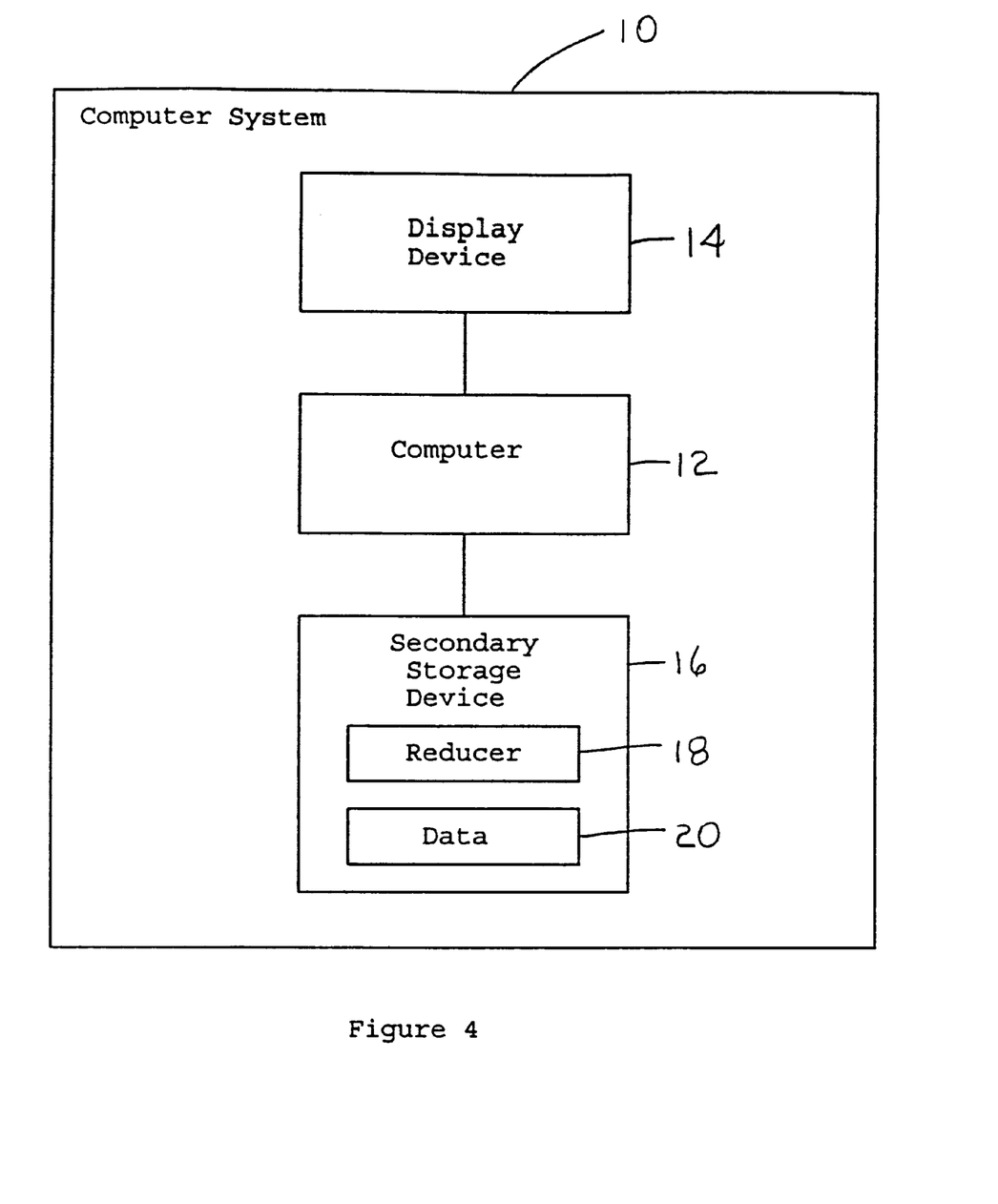
FIG. 4 is a block diagram illustrating the components of a computer system in which the preferred embodiment of the present invention operates.

A computer system 10 in which the preferred embodiment of the present invention operates is illustrated in FIG. 4. The computer system 10 includes a computer 12 for controlling the operation of the system. The computer 12 is connected to a display device 14 and a secondary storage device 16. The secondary storage device 16 may be any of various well-known secondary storage devices, such as a CD-ROM, a diskette, or a hard disk. A reducer 18 is stored in the secondary storage device 16 for execution by the computer 12. Additionally, data 20 regarding an image to be displayed is stored in the secondary storage device 16.

The computer 12 typically includes a central processing unit and a primary storage device (not separately shown). Additionally, the computer 12 typically is connected to a variety of input/output ("I/O") devices, such as display devices, keyboards, printing devices, and secondary storage devices (not separately shown other than display device 14 and secondary storage device 16). These components of the computer system 10 are well-known in the art and will not be discussed in greater detail.

For the sake of simplicity, the computer system 10 of the present invention has been illustrated with a stand-alone computer 12 connected to a single display device 14 and a single secondary storage device 16. However, one of ordinary skill in the art will appreciate that the computer system 10 could include any number of computers and other components, including components other than those separately shown (and typically, would include a multiple number of computers and other components). These computers and other components would be connected to one another either directly or via a network. Further, while the reducer 18 and the data 20 have been shown as stored in the same secondary storage device 16, one of ordinary skill in the art will appreciate that the reducer and the data could be stored in different secondary storage devices (and typically, would be stored in different secondary storage devices).

Figure 5:
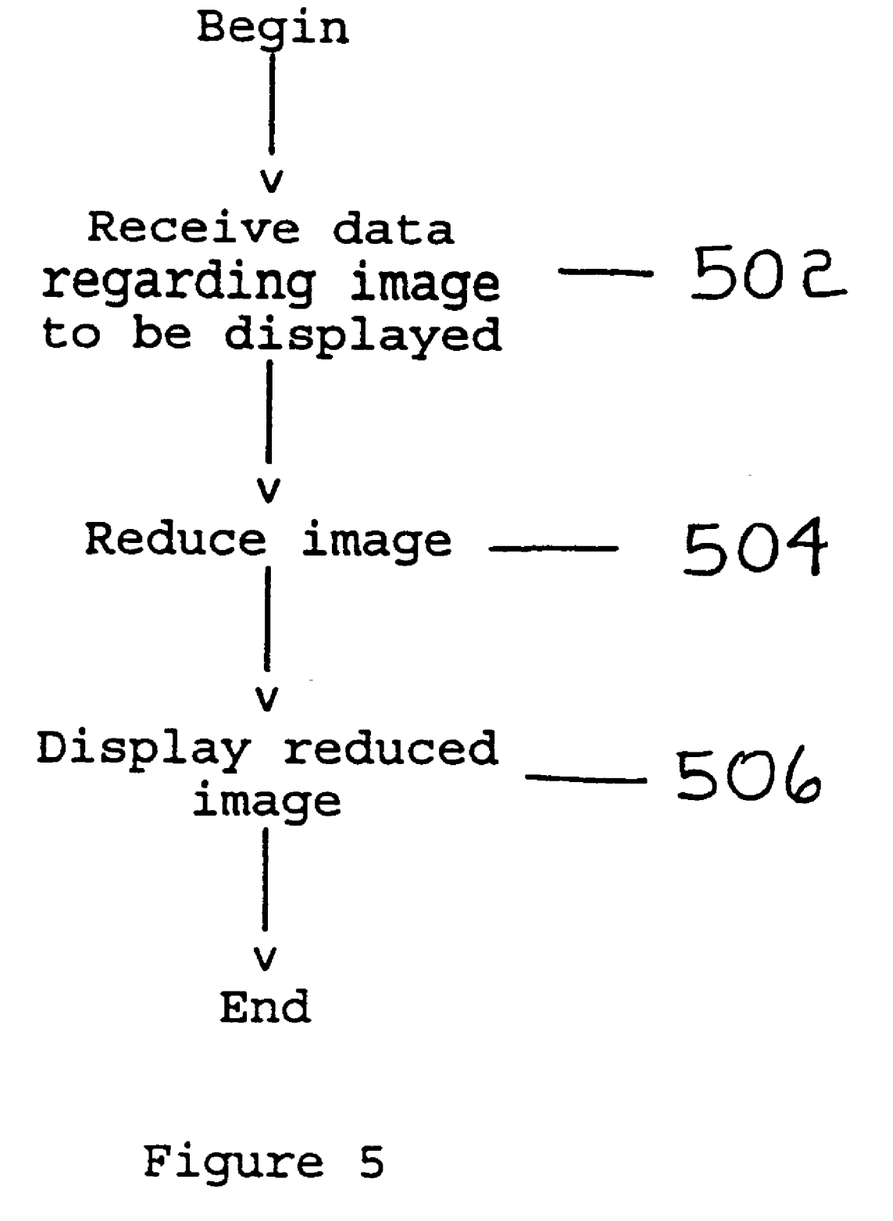
FIG. 5 is a flowchart generally illustrating the preferred steps performed in the operation of the computer system of FIG. 4.

FIG. 5 generally illustrates the preferred steps performed in the operation of the computer system of the present invention. Initially, the computer 12 receives data 20 regarding an image to be displayed from the secondary storage device 16 (step 502). The reducer 18 reduces the image using the principles of the present invention (step 504). Lastly, the computer 12 displays the reduced image on the display device 14 (step 506).

In a preferred embodiment of the present invention, the data that is received from the secondary storage device includes certain data in addition to data representing the image itself. Specifically, the data includes data regarding a center of relevance of the image. The data regarding the center of relevance is preferably in the form of (x, y) coordinates of the center of relevance. The (x, y) coordinates of the center of relevance are stored with the data representing the image and are transmitted to the computer with the image data.

Figure 6:
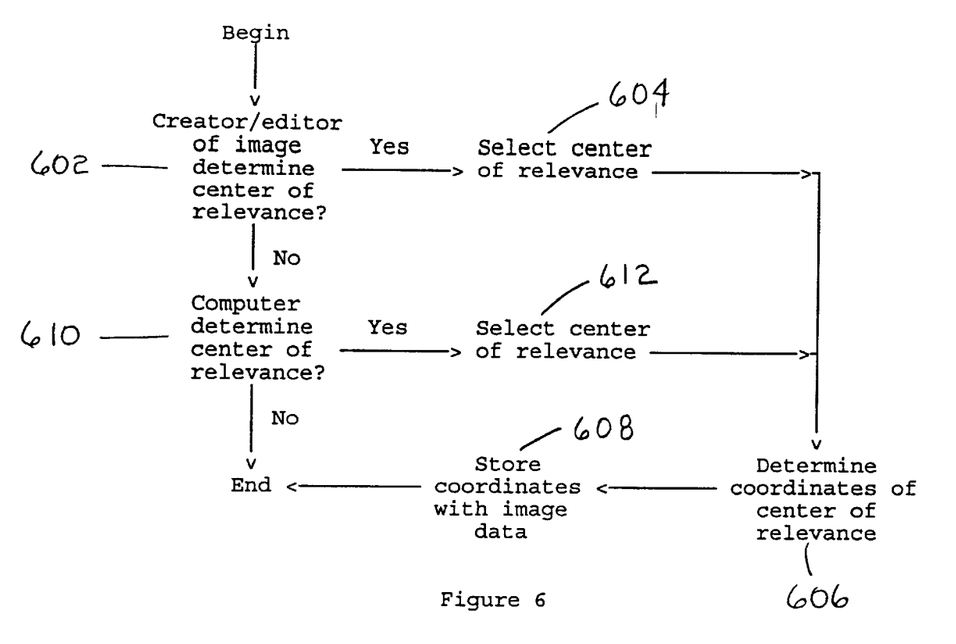
FIG. 6 is a flowchart illustrating the preferred steps performed in determining a center of relevance of an image.
Figure 7:
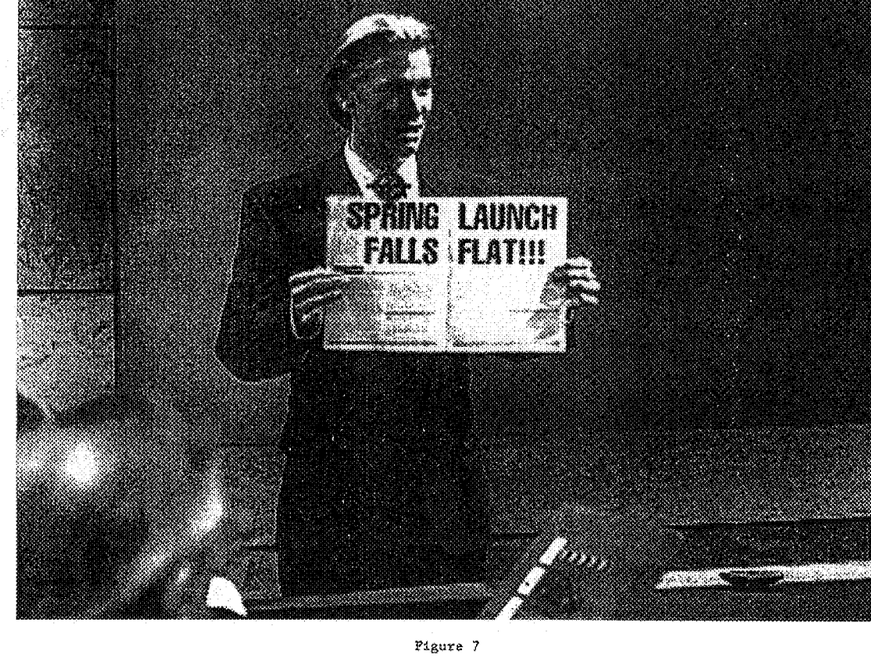
FIG. 7 is the image of FIG. 1 after a creator/editor of the image has selected the center of relevance of the image.

FIG. 6 illustrates the preferred steps performed in determining the data regarding the center of relevance of an image. In a preferred embodiment of the present invention, a creator or an editor of the image determines the center of relevance (step 602). In this case, when the creator/editor of the image has completed creating/editing the image, the creator/editor selects the center of relevance, such as by using selection techniques (e.g., clicking a mouse over the center of relevance) (step 604). The creator/editor's computer then determines the (x, y) coordinates of the center of relevance (step 606) and the coordinates are stored with the image data (step 608). FIG. 7 shows the image of FIG. 1 after the creator/editor has clicked on the center of relevance, as indicated by the cross-hairs. In this example, the creator/editor has selected the knot of the man's tie as the center of relevance. In an alternate embodiment, a computer (such as the creator/editor's computer) determines the center of relevance (step 610). In this case, when the creator/editor of the image has completed creating/editing the image, the computer selects the center of relevance, such as by using pattern recognition techniques (step 612). Such pattern recognition techniques are well-known in the art and will not be discussed in greater detail. The computer then determines the (x, y) coordinates of the center of relevance (step 606) and the coordinates are stored with the image data (step 608).

Figure 8:
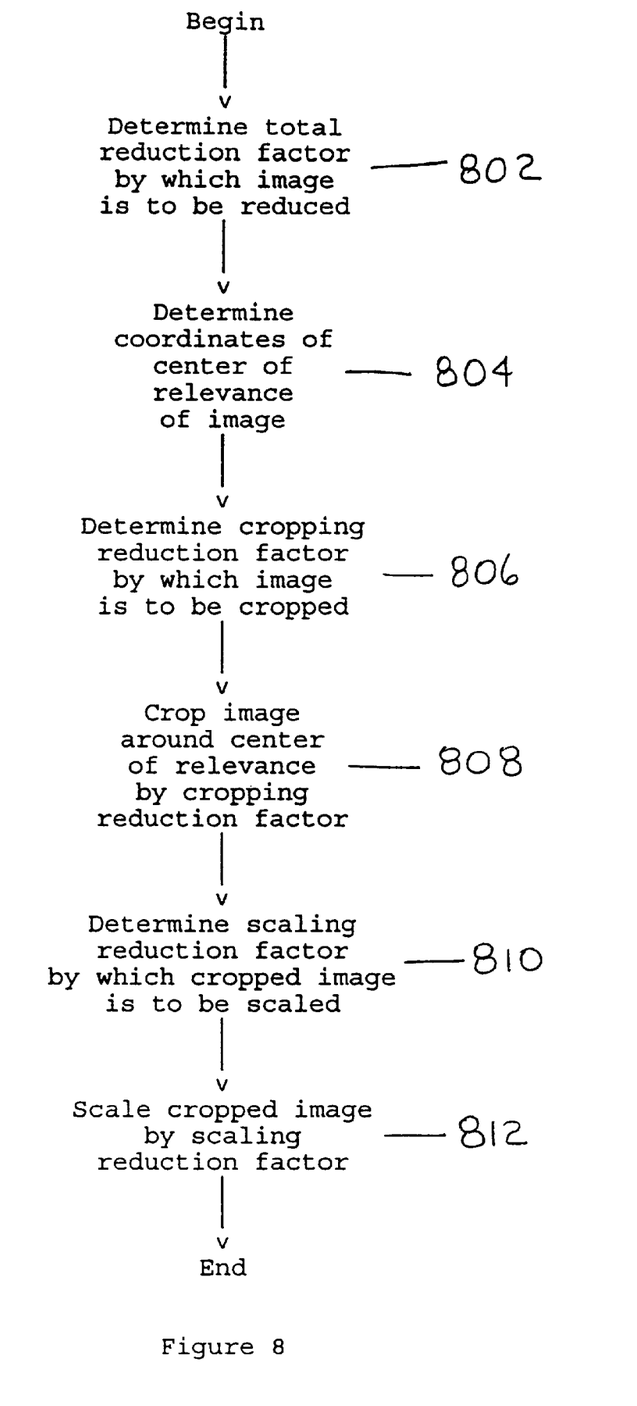
FIG. 8 is a flowchart illustrating in greater detail the preferred step of reducing an image, as generally illustrated in FIG. 5.

FIG. 8 illustrates the preferred step of reducing the image using the principles of the present invention (step 504) in greater detail. Initially, the reducer determines a total reduction factor, rho, by which the image is to be reduced (step 802). More specifically, the image is to be reduced to rho percent of its original size in both the horizontal, x, and vertical, y, directions. The reducer then determines the (x, y) coordinates of the center of relevance of the image $(x_{cr}, Y_{cr})$ (step 804). In a preferred embodiment of the present invention, the (x, y) coordinates of the center of relevance were determined and stored with the image data (as described in detail above in connection with FIG. 6). If the data that is received from the secondary storage device does not include data regarding the center of relevance of the image, the reducer determines the center of relevance using the geometric center of the image.

Next, the reducer determines a cropping reduction factor, $rho_c$, by which the image is to be cropped (step 806) and crops the image around the center of relevance by the cropping reduction factor (step 808), where $rho_c = rho^a$ and a is a predetermined percentage of the total reduction that is to be accomplished by cropping. More specifically, the image is reduced to $rho^a$ percent of its original size in both the horizontal, x, and vertical, y, directions. The preferred step of cropping the image will be described in greater detail below in connection with FIG. 9. Lastly, the reducer determines a scaling reduction factor, $rho_s$, by which the cropped image is to be scaled (step 810) and scales the cropped image by the scaling reduction factor (step 812), where $rho_s = rho^b$ and b is a predetermined percentage of the total reduction that is to be accomplished by scaling. More specifically, the image is reduced to $rho^b$ percent of its cropped size in both the horizontal, x, and vertical, y, directions. The preferred step of scaling the image will be described in greater detail below in connection with FIG. 10.

The percentage of the total reduction that is accomplishing by cropping, a, and the percentage of the total reduction that is accomplished by scaling, b, can be varied so long as a+b=1. When a+b=1, $rho^a * rho^b = rho$ and, thus, $rho_c * rho_s = rho$. In general, varying the percentages of the total reduction that are accomplished by cropping and by scaling assigns varying priorities to maintaining the resolution and the context of the original image. More specifically, if the percentage of the total reduction that is accomplished by cropping is greater than the percentage of the total reduction that is accomplished by scaling, greater priority is assigned to maintaining the resolution of the original image than to maintaining the context of the original image. Conversely, if the percentage of the total reduction that is accomplished by scaling is greater than the percentage of the total reduction that is accomplished by cropping, greater priority is assigned to maintaining the context of the original image than to maintaining the resolution of the original image.

In a preferred embodiment of the present invention, the reducer crops and scales the image by equal amounts (thus, a=0.5 and b=0.5). In this case, equal priority is assigned to maintaining the resolution of the original image and the context of the original image. Then, if rho=0.4, $rho_c = rho^a = (0.4)^{0.5} = 0.63$ and $rho_s = rho^b = (0.4)^{0.5} = 0.63$. As a result, the total reduction will reduce the image to 40% of its original size in both the horizontal, x, and vertical, y, directions, with cropping reducing the image to 63% of its original size in both the horizontal and vertical directions and scaling further reducing the image to 63% of its cropped size in both the horizontal and vertical directions.

If a greater percentage of the total reduction had been accomplished by cropping than by scaling (e.g., a=0.8 and b=0.2), then $rho_c = rho^a = (0.4)^{0.8} = 0.48$ and $rho_s = rho^b = (0.4)^{0.2} = 0.83$. Again, the total reduction will reduce the image to 40% of its original size in both the horizontal, x, and vertical, y, directions, but cropping will reduce the image to 48% of its original size in both the horizontal and vertical directions and scaling will only further reduce the image to 83% of its cropped size in both the horizontal and vertical directions. Conversely, if a greater percentage of the total reduction had been accomplished by scaling than by cropping (e.g., a=0.3 and b=0.7), then $rho_c = rho^a = (0.4)^{0.3} = 0.76$ and $rho_s = rho^b = (0.4)^{0.7} = 0.53$. Again, the total reduction will reduce the image to 40% of its original size in both the horizontal, x, and vertical, y, directions, but cropping will only reduce the image to 76% of its original size in both the horizontal and vertical directions and scaling will further reduce the image to 53% of its cropped size in both the horizontal and vertical directions.

Figure 9:
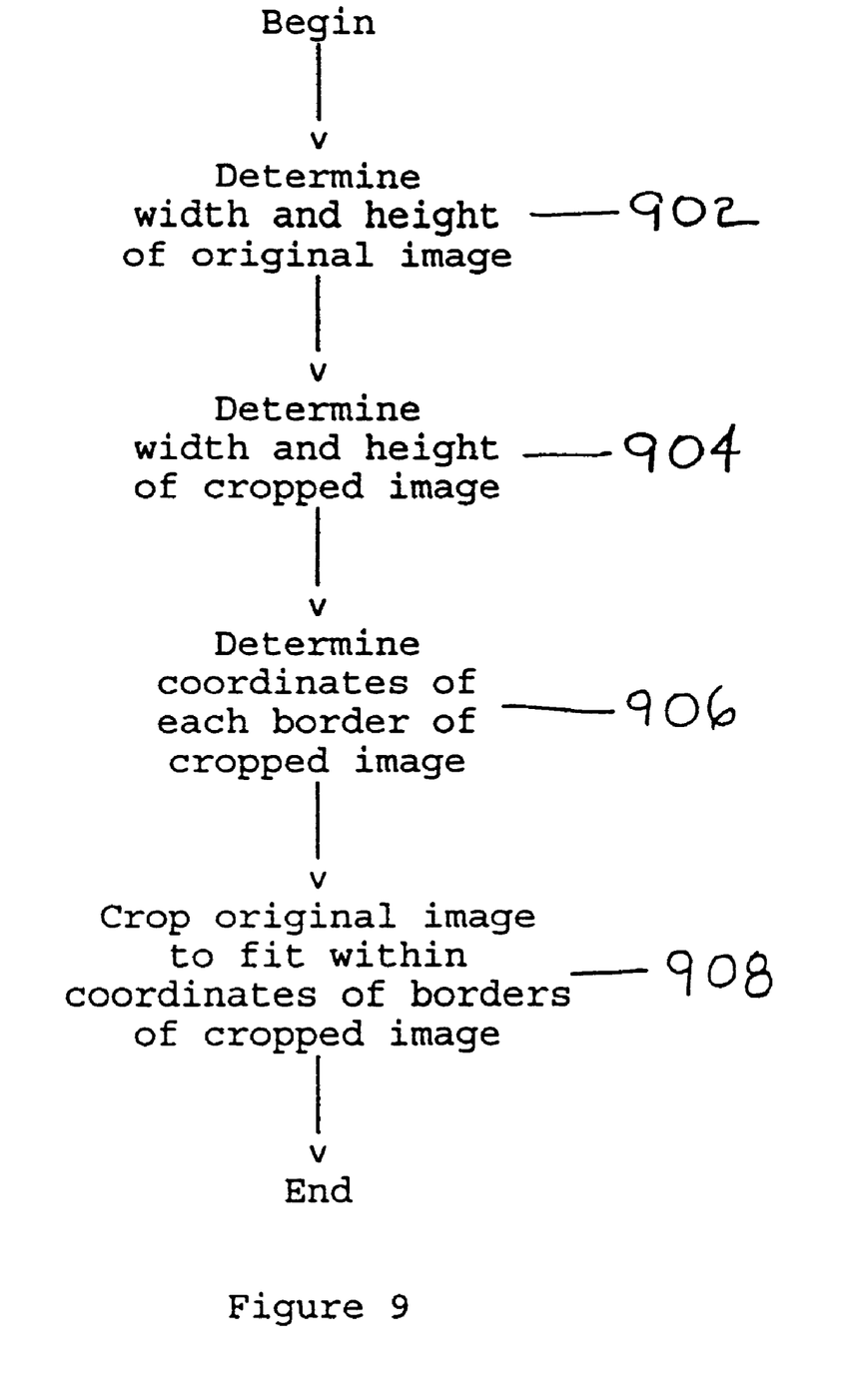
FIG. 9 is a flowchart illustrating in greater detail the preferred step of cropping an image, as generally illustrated in FIG. 8.

FIG. 9 illustrates the preferred step of cropping the image (step 808) in greater detail. Initially, the reducer determines a width of the original image, $w_o$, and a height of the original image, $h_o$ (step 902). The width of the original image, $w_o$, is the difference between the x coordinate of the right border of the original image, $x_{orb}$, and the x coordinate of the left border of the original image, $x_{olb}$ (thus, $w_o = x_{orb} - x_{olb}$). The height of the original image, $h_o$, is the difference between the y coordinate of the top border of the original image, $y_{otb}$, and the y coordinate of the bottom border of the original image, $y_{obb}$ (thus, $h_o = y_{otb} - y_{obb}$). The reducer then determines a width of the cropped image, $w_c$, and a height of the cropped image, $h_c$ (step 904). The width of the cropped image, $w_c$, is a product of the width of the original image, $w_o$, and the cropping reduction factor, $rho_c = rho^a$ (thus, $w_c = w_o * rho^a$). The height of the cropped image, $h_c$, is a product of the height of the original image, $h_o$, and the cropping reduction factor, $rho_c = rho^a$ (thus, $h_c = h_o * rho^a$). Next, the reducer determines the coordinates of each border of the cropped image (step 906). Lastly, the reducer crops the original image to fit within the determined coordinates of the borders of the cropped image (step 908).

In determining the coordinates of each border of the cropped image, the reducer starts at the (x, y) coordinates of the center of relevance, ($x_{cr}$, $y_{cr}$), and either adds or subtracts one-half of the width or the height of the cropped image, ½$w_c$ or ½$h_c$ (depending on the border for which the reducer is determining the coordinates). More specifically:

(1) if the reducer is determining the x coordinate of the left border of the cropped image, $x_{clb}$, the reducer subtracts one-half of the width of the cropped image, ½$w_c$, from the x coordinate of the center of relevance, $x_{cr}$ (thus, $x_{clb} = x_{cr} - ½w_c$);

(2) if the reducer is determining the x coordinate of the right border of the cropped image, $x_{crb}$, the reducer adds one-half of the width of the cropped image, ½$w_c$, to the x coordinate of the center of relevance, $x_{cr}$, (thus, $x_{crb} = x_{cr} + ½w_c$);

(3) if the reducer is determining the y coordinate of the top border of the cropped image, $y_{ctb}$, the reducer adds one-half of the height of the cropped image, ½$h_c$, to the y coordinate of the center of relevance, $y_{cr}$ (thus, $y_{ctb} = y_{cr} + ½h_c$); and (4) if the reducer is determining the y coordinate of the bottom border of the cropped image, $y_{cbb}$, the reducer subtracts one-half of the height of the cropped image, ½$h_c$, from the y coordinate of the center of relevance, $y_{cr}$ (thus, $y_{cbb} = y_{cr} - ½h_c$).

Additionally, in determining the coordinates of each border of the cropped image, if necessary, the reducer adjusts the coordinates of the borders in order to prevent a border of the cropped image from going outside the borders of the original image (thus, preventing the cropped image from including white space). When the reducer determines the coordinates of each border of the cropped image, the reducer checks to see whether the cropped border is outside the original border. If the cropped border is outside the original border, the reducer uses the original border as the cropped border and then adjusts the coordinates of the opposing border in order to maintain the proper width and 5 height of the cropped image.

The following examples illustrate the preferred step of cropping the image.

Figure 10:
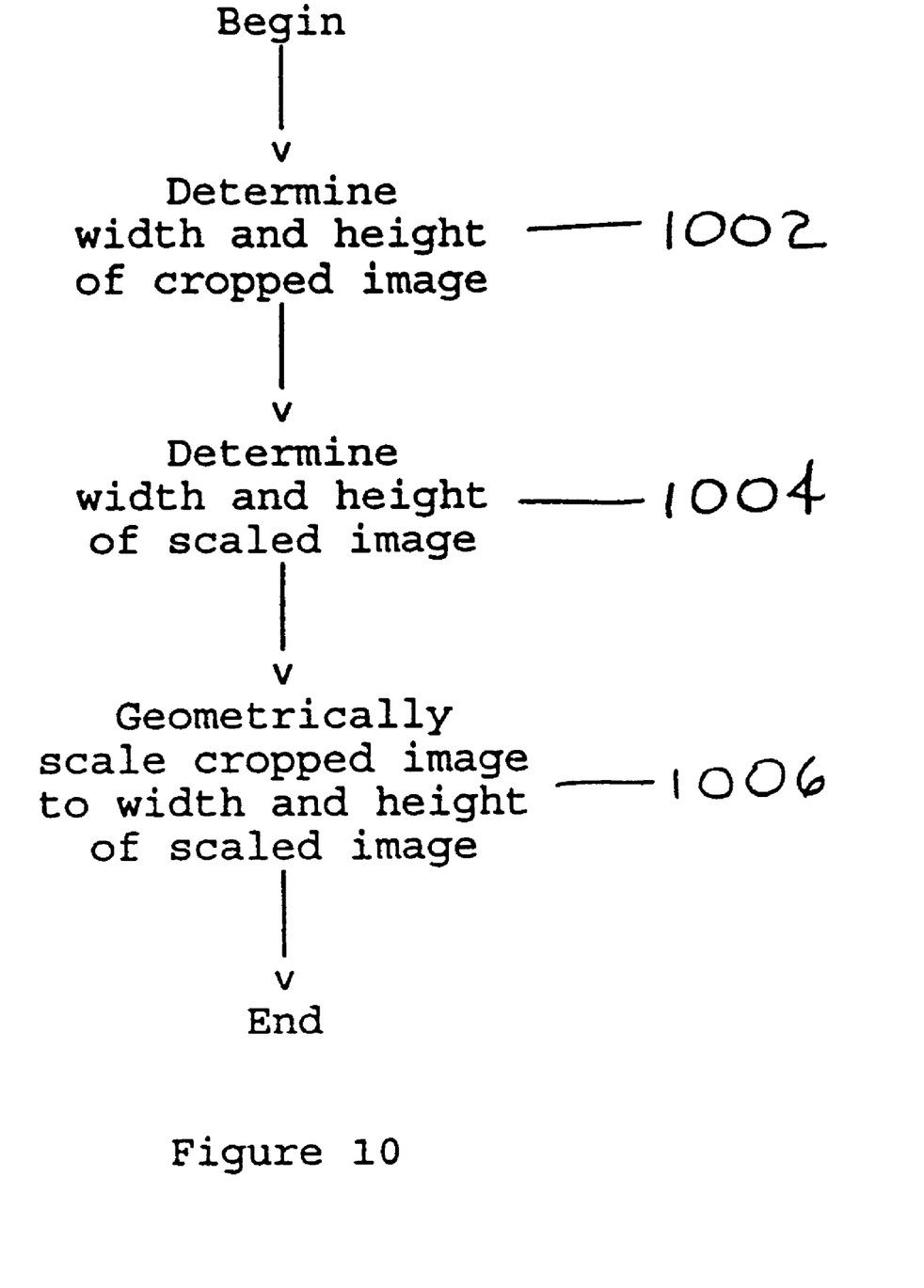
FIG. 10 is a flowchart illustrating in greater detail the preferred step of scaling an image, as generally illustrated in FIG. 8.

If: $x_{olb} = 0$ and $x_{orb} = 48$ (1a)
$y_{otb} = 32$ and $y_{obb} = 0$
$x_{cr} = 22$ and $y_{cr} = 18$
$rho = 0.4$
$a = 0.5$ and $b = 0.5$ Then: $w_o = 48$ and $h_o = 32$
$w_c = w_o * rho^a = 48 * (0.4)^{0.5} = 30$
$h_c = h_o * rho^a = 32 * (0.4)^{0.5} = 20$ Then: $x_{clb} = x_{cr} - \frac{1}{2}w_c = 22 - \frac{1}{2}(30) = 7$
$x_{crb} = x_{cr} + \frac{1}{2}w_c = 22 + \frac{1}{2}(30) = 37$
$y_{ctb} = y_{cr} + \frac{1}{2}h_c = 18 + \frac{1}{2}(20) = 28$
$y_{cbb} = y_{cr} - \frac{1}{2}h_c = 18 - \frac{1}{2}(20) = 8$ If: $x_{olb} = 0$ and $x_{orb} = 48$ (2a)
$y_{otb} = 32$ and $y_{obb} = 0$
$x_{cr} = 38$ and $y_{cr} = 26$
$rho = 0.4$
$a = 0.5$ and $b = 0.5$ Then: $w_o = 48$ and $h_o = 32$
$w_c = w_o * rho^a = 48 * (0.4)^{0.5} = 30$
$h_c = h_o * rho^a = 32 * (0.4)^{0.5} = 20$ Then: $x_{clb} = x_{cr} - \frac{1}{2}w_c = 38 - \frac{1}{2}(30) = 23$
$x_{crb} = x_{cr} + \frac{1}{2}w_c = 38 + \frac{1}{2}(30) = 53$
$y_{ctb} = y_{cr} + \frac{1}{2}h_c = 26 + \frac{1}{2}(20) = 36$
$y_{cbb} = y_{cr} - \frac{1}{2}h_c = 26 - \frac{1}{2}(20) = 16$ However: $x_{crb} > x_{orb}$
$y_{ctb} > y_{otb}$ Then: $x_{clb} = 23 - 5 = 18$
$x_{crb} = x_{orb} = 48$
$y_{ctb} = y_{otb} = 32$
$y_{cbb} = 16 - 2 = 14$ FIG. 10 illustrates the preferred step of scaling the image (step 812) in greater detail. Initially, the reducer determines the width of the cropped image, $w_c$, and the height of the cropped image, $h_c$ (step 1002). The width and the height of the cropped image were determined by the reducer during the preferred step of cropping the image (as described in detail above in connection with FIG. 9). Next, the reducer determines a width of the scaled image, $w_s$, and a height of the scaled image, $h_s$ (step 1004). The width of the scaled image, $w_s$, is a product of the width of the cropped image, $w_c$, and the scaling reduction factor, $rho_s = rho^b$ (thus, $w_s = w_c * rho^b$). The height of the scaled image, $h_s$, is a product of the height of the cropped image, $h_c$, and the scaling reduction factor, $rho_s = rho^b$ (thus, $h_s = h_c * rho^b$). Lastly, the reducer geometrically scales the cropped image to the determined width and height of the scaled image (step 1006). Geometric scaling of an image is well-known in the art and will not be discussed in greater detail. For a more detailed discussion of geometric scaling of an image, see *Computer Graphics, Principles and Practice*, by James D. Foley, Andries van Dam, Steven K. Feiner, and John F. Hughes (2nd Edition, Addison-Wesley Publishing Company, Inc., 1990).

The following examples illustrate the preferred step of scaling the image (these examples continue from the earlier examples illustrating the preferred step of cropping the image).

Figure 11A:
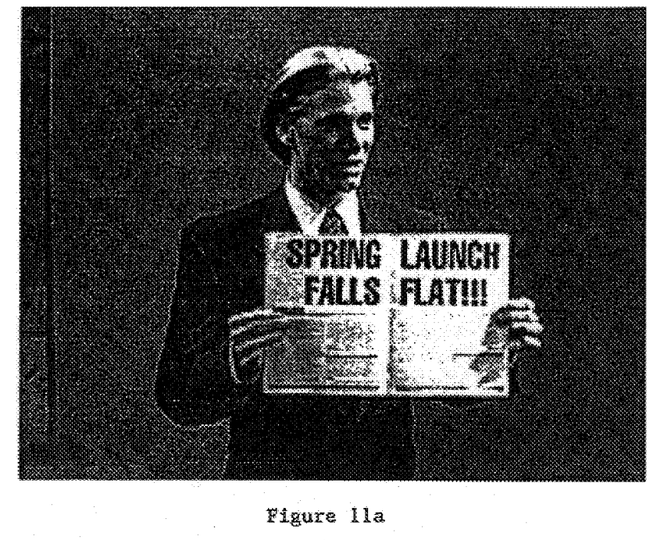
FIGS. 11a, 11b, and 11c are the image of FIG. 1 after it has been reduced using the principles of the present invention to fit in a display area that has been reduced to 50%, 25%, and 12.5%, respectively, of the size of the original display area in both the horizontal and vertical directions.
Figure 11B:
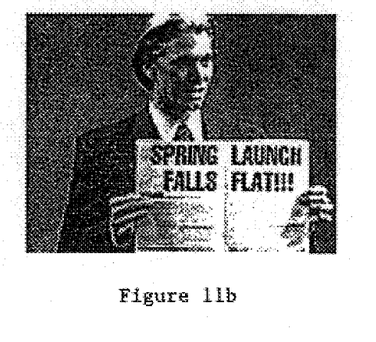
Figure 11C:
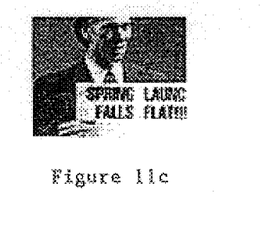

If: $w_c = 30$ and $h_c = 20$ (1b)
(as determined above in example 1a)
$rho = 0.4$
$a = 0.5$ and $b = 0.5$ Then: $w_s = w_c * rho^b = 30 * (0.4)^{0.5} = 19$
$h_s = h_c * rho^b = 20 * (0.4)^{0.5} = 13$ If: $w_c = 30$ and $h_c = 20$ (2b)
(as determined above in example 2a)
$rho = 0.4$
$a = 0.5$ and $b = 0.5$ Then: $w_s = w_c * rho^b = 30 * (0.4)^{0.5} = 19$
$h_s = h_c * rho^b = 20 * (0.4)^{0.5} = 13$ FIGS. 11a, 11b, and 11c show the image of FIG. 1 after it has been reduced using the principles of the present invention to fit in a display area that has been reduced to 50%, 25%, and 12.5%, respectively, of the size of the original display area in both the horizontal, x, and vertical, y, directions. The center of relevance is the knot of the man's tie, as shown in FIG. 7.

As can be seen from a comparison of FIGS. 2a/2b/2c, FIGS. 3a/3b/3c, and FIGS. 11a/11b/11c, the relevance-enhanced reduction more accurately conveys the overall content of the image than either cropping or scaling. Cropping maintains the resolution of the image, but sacrifices the context of the image, as shown in FIGS. 2a/2b/2c. Conversely, scaling maintains the context of the image, but sacrifices the resolution of the image, as shown in FIGS. 3a/3b/3c. In contrast to both cropping and scaling, relevance-enhanced reduction balances maintaining the resolution of the image with maintaining the context of the image, as shown in FIGS. 11a/11b/11c. In fact, as shown in FIG. 11c, even when the image has been reduced to 12.5% of its original size in both the horizontal and vertical directions, it is still possible to convey the overall content of the image, i.e., a man holding a newspaper with a headline that reads "SPRING LAUNCH FALLS FLAT!!!" Both of the other methods make it impossible to convey the overall content of the image at this level of reduction.

One of ordinary skill in the art will now appreciate that the preferred embodiment of the present invention provides a method and system for providing relevance-enhanced image reduction in computer systems. Using such a method and system, information including images can be displayed in a display area that is smaller than the display area for which the information was designed while accurately conveying the overall content of the information.

Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A method executed in a computer system for providing relevance-enhanced image reduction, the method comprising the steps of:

receiving data regarding an image to be displayed, the data including data representing the image together with data regarding a center of relevance of the image;

automatically reducing the image using the data regarding the center of relevance by first cropping the image around the center of relevance and then scaling the image; and displaying the reduced image.

2. The method of claim 1, further including the steps of:

having a creator or editor of the image determine the data regarding the center of relevance of the image using selection techniques; and storing the data regarding the center of relevance with the data representing the image.

3. The method of claim 1, wherein the step of reducing the image includes the steps of:

determining a cropping reduction factor by which the image is to be cropped;

cropping the image by the cropping reduction factor;

determining a scaling reduction factor by which the cropped image is to be scaled; and scaling the cropped image by the scaling reduction factor.

4. The method of claim 1, wherein the step of reducing the image further includes the step of determining the center of relevance of the image.

5. The method of claim 4, wherein the step of determining the center of relevance of the image includes the step of determining the center of relevance from data regarding the center of relevance stored with data representing the image.

6. The method of claim 3, wherein the step of cropping the image by the cropping reduction factor includes the steps of:

determining a width and a height of the image;

determining a width and a height of the cropped image, wherein the width of the cropped image is a product of the width of the image and the cropping reduction factor, and wherein the height of the cropped image is a product of the height of the image and the cropping reduction factor;

determining coordinates of each border of the cropped image using the width and the height of the cropped image; and cropping the image to fit within the coordinates of the borders of the cropped image.

7. The method of claim 6, wherein the step of scaling the cropped image by the scaling reduction factor includes the steps of:

determining a width and a height of the scaled image, wherein the width of the scaled image is a product of the width of the cropped image and the scaling reduction factor, and wherein the height of the scaled image is a product of the height of the cropped image and the scaling reduction factor; and geometrically scaling the cropped image to the width and the height of the scaled image.

8. The method of claim 3, wherein the step of reducing the image further includes the step of determining a total reduction factor by which the image is to be reduced; and wherein the total reduction factor is a product of the cropping reduction factor and the scaling reduction factor.

9. The method of claim 3, wherein the step of reducing the image further includes the step of determining a total reduction factor by which the image is to be reduced;

wherein the cropping reduction factor is the total reduction factor raised to a power of a percentage of the total reduction that is to be accomplished by cropping, $rho_c = rho^a$, where $rho_c$ is the cropping reduction factor, rho is the total reduction factor, and a is the percentage of the total reduction that is to be accomplished by cropping;

wherein the scaling reduction factor is the total reduction factor raised to a power of a percentage of the total reduction that is to be accomplished by scaling, $rho_s = rho^b$, where $rho_s$ is the scaling reduction factor, rho is the total reduction factor, and b is the percentage of the total reduction that is to be accomplished by scaling; and wherein a sum of the percentage of the total reduction that is to be accomplished by cropping and the percentage of the total reduction that is to be accomplished by scaling is one, a+b=1.

10. A method executed in a computer system for providing relevance-enhanced image reduction, the method comprising the steps of:

receiving data regarding an image to be displayed;

determining a total reduction factor by which the image is to be reduced;

determining a cropping reduction factor by which the image is to be cropped, wherein the cropping reduction factor is the total reduction factor raised to a power of a percentage of the total reduction that is to be accomplished by cropping, $rho_c = rho^a$, where $rho_c$ is the cropping reduction factor, rho is the total reduction factor, and a is the percentage of the total reduction that is to be accomplished by cropping;

determining a scaling reduction factor by which the cropped image is to be scaled, wherein the scaling reduction factor is the total reduction factor raised to a power of a percentage of the total reduction that is to be accomplished by scaling, $rho_s = rho^b$, where $rho_s$ is the scaling reduction factor, rho is the total reduction factor, and b is the percentage of the total reduction that is to be accomplished by scaling;

wherein a sum of the percentage of the total reduction that is to be accomplished by cropping and the percentage of the total reduction that is to be accomplished by scaling is one, a+b=1;

if greater priority is to be assigned to maintaining resolution of the image than to maintaining context of the image, assigning a higher value to the percentage of the total reduction that is to be accomplished by cropping than to the percentage of the total reduction that is to be accomplished by scaling;

if greater priority is to be assigned to maintaining the context of the image than to maintaining the resolution of the image, assigning a higher value to the percentage of the total reduction that is to be accomplished by scaling than to the percentage of the total reduction that is to be accomplished by cropping;

cropping the image by the cropping reduction factor;

scaling the cropped image by the scaling reduction factor; and displaying the reduced image.

11. A computer program product for providing relevance-enhanced image reduction in a computer system, the computer program product comprising:

computer readable program code configured to receive data regarding an image to be displayed, the data including data representing the image together with data regarding a center of relevance of the image;

computer readable program code configured to automatically reduce the image using the data regarding the center of relevance by first cropping the image around the center of relevance and then scaling the image;

computer readable program code configured to display the reduced image; and a computer readable medium in which the computer readable program codes are stored.

12. The computer program product of claim 11, further including:

computer readable program code configured to have a creator or editor of the image determine the data regarding the center of relevance of the image using selection techniques; and computer readable program code configured to store the data regarding the center of relevance with the data representing the image.

13. The computer program product of claim 11, wherein the computer readable program code configured to reduce the image includes:

computer readable program code configured to determine a cropping reduction factor by which the image is to be cropped;

computer readable program code configured to crop the image by the cropping reduction factor;

computer readable program code configured to determine a scaling reduction factor by which the cropped image is to be scaled; and computer readable program code configured to scale the cropped image by the scaling reduction factor.

14. The computer program product of claim 11, wherein the computer readable program code configured to reduce the image further includes computer readable program code configured to determine the center of relevance of the image.

15. The computer program product of claim 14, wherein the computer readable program code configured to determine the center of relevance of the image includes computer readable program code configured to determine the center of relevance from data regarding the center of relevance stored with data representing the image.

16. The computer program product of claim 13, wherein the computer readable program code configured to crop the image by the cropping reduction factor includes:

computer readable program code configured to determine a width and a height of the image;

computer readable program code configured to determine a width and a height of the cropped image, wherein the width of the cropped image is a product of the width of the image and the cropping reduction factor, and wherein the height of the cropped image is a product of the height of the image and the cropping reduction factor;

computer readable program code configured to determine coordinates of each border of the cropped image using the width and the height of the cropped image; and computer readable program code configured to crop the image to fit within the coordinates of the borders of the cropped image.

17. The computer program product of claim 16, wherein the computer readable program code configured to scale the cropped image by the scaling reduction factor includes:

computer readable program code configured to determine a width and a height of the scaled image, wherein the width of the scaled image is a product of the width of the cropped image and the scaling reduction factor, and wherein the height of the scaled image is a product of the height of the cropped image and the scaling reduction factor; and computer readable program code configured to geometrically scale the cropped image to the width and the height of the scaled image.

18. The computer program product of claim 13, wherein the computer readable program code configured to reduce the image further includes computer readable program code configured to determine a total reduction factor by which the image is to be reduced; and wherein the total reduction factor is a product of the cropping reduction factor and the scaling reduction factor.

19. The computer program product of claim 13, wherein the computer readable program code configured to reduce the image further includes computer readable program code configured to determine a total reduction factor by which the image is to be reduced;

wherein the cropping reduction factor is the total reduction factor raised to a power of a percentage of the total reduction that is to be accomplished by cropping, $rho_c = rho^a$, where $rho_c$ is the cropping reduction factor, rho is the total reduction factor, and a is the percentage of the total reduction that is to be accomplished by cropping;

wherein the scaling reduction factor is the total reduction factor raised to a power of a percentage of the total reduction that is to be accomplished by scaling, $rho_s = rho^b$, where $rho_s$ is the scaling reduction factor, rho is the total reduction factor, and b is the percentage of the total reduction that is to be accomplished by scaling; and wherein a sum of the percentage of the total reduction that is to be accomplished by cropping and the percentage of the total reduction that is to be accomplished by scaling is one, a+b=1.

20. A computer program product for providing relevance-enhanced image reduction in a computer system, the computer program product comprising:

computer readable program code configured to receive data regarding an image to be displayed;

computer readable program code configured to determine a total reduction factor by which the image is to be reduced;

computer readable program code configured to determine a cropping reduction factor by which the image is to be cropped, wherein the cropping reduction factor is the total reduction factor raised to a power of a percentage of the total reduction that is to be accomplished by cropping, $rho_c = rho^a$, where $rho_c$ is the cropping reduction factor, rho is the total reduction factor, and a is the percentage of the total reduction that is to be accomplished by cropping;

computer readable program code configured to determine a scaling reduction factor by which the cropped image is to be scaled, wherein the scaling reduction factor is the total reduction factor raised to a power of a percentage of the total reduction that is to be accomplished by scaling, $rho_s = rho^b$, where $rho_s$ is the scaling reduction factor, rho is the total reduction factor, and b is the percentage of the total reduction that is to be accomplished by scaling;

wherein a sum of the percentage of the total reduction that is to be accomplished by cropping and the percentage of the total reduction that is to be accomplished by scaling is one, a+b=1;

computer readable program code configured to, if greater priority is to be assigned to maintaining resolution of the image than to maintaining context of the image, assign a higher value to the percentage of the total reduction that is to be accomplished by cropping than to the percentage of the total reduction that is to be accomplished by scaling;

computer readable program code configured to, if greater priority is to be assigned to maintaining the context of the image than to maintaining the resolution of the image, assign a higher value to the percentage of the total reduction that is to be accomplished by scaling than to the percentage of the total reduction that is to be accomplished by cropping;

computer readable program code configured to crop the image by the cropping reduction factor;

computer readable program code configured to scale the cropped image by the scaling reduction factor;

computer readable program code configured to display the reduced image; and a computer readable medium in which the computer readable program codes are stored.

21. A system for providing relevance-enhanced image reduction in a computer system, the system comprising:

a computer configured to control the operation of the system;

a display device connected to said computer configured to display an image;

a secondary storage device connected to said computer, said secondary storage device having data regarding the image to be displayed stored therein, the data including data representing the image and data regarding a center of relevance of the image; and a reducer configured to automatically reduce the image using the data regarding the center of relevance by first cropping the image around the center of relevance and then scaling the image, said reducer being stored in said secondary storage device and executed by said computer.

22. The system of claim 21, wherein said reducer is further configured to:

determine a cropping reduction factor by which the image is to be cropped;

crop the image by the cropping reduction factor;

determine a scaling reduction factor by which the cropped image is to be scaled; and scale the cropped image by the scaling reduction factor.

23. The system of claim 21, wherein said reducer is further configured to:

determine the center of relevance of the image.

24. The system of claim 22, wherein said reducer is further configured to determine a total reduction factor by which the image is to be reduced; and wherein the total reduction factor is a product of the cropping reduction factor and the scaling reduction factor.

25. The system of claim 22, wherein said reducer is further configured to determine a total reduction factor by which the image is to be reduced;

wherein the cropping reduction factor is the total reduction factor raised to a power of a percentage of the total reduction that is to be accomplished by cropping, $rho_c = rho^a$, where $rho_c$ is the cropping reduction factor, rho is the total reduction factor, and a is the percentage of the total reduction that is to be accomplished by cropping;

wherein the scaling reduction factor is the total reduction factor raised to a power of a percentage of the total reduction that is to be accomplished by scaling, $rho_s = rho^b$, where $rho_s$ is the scaling reduction factor, rho is the total reduction factor, and b is the percentage of the total reduction that is to be accomplished by scaling; and wherein a sum of the percentage of the total reduction that is to be accomplished by cropping and the percentage of the total reduction that is to be accomplished by scaling is one, a+b=1.

26. The system of claim 21, wherein said computer is a stand-alone computer.

27. The system of claim 21, wherein said computer is connected to a network.

* * * * *